US007930873B2

(12) United States Patent
Darden

(10) Patent No.: US 7,930,873 B2
(45) Date of Patent: Apr. 26, 2011

(54) TWO PIECE PERIPHERAL MOWER BLADE

(76) Inventor: John A. Darden, Lenox, GA (US)

( * ) Notice: Subject to any disclaimer, the term of this patent is extended or adjusted under 35 U.S.C. 154(b) by 0 days.

(21) Appl. No.: 12/720,244

(22) Filed: Mar. 9, 2010

(65) Prior Publication Data

US 2010/0223898 A1 Sep. 9, 2010

Related U.S. Application Data

(60) Provisional application No. 61/158,455, filed on Mar. 9, 2009.

(51) Int. Cl.
*A01D 34/53* (2006.01)

(52) U.S. Cl. ............. 56/249; 56/255; 56/294; 56/295

(58) Field of Classification Search .............. 56/157, 56/249, 249.5, 255, 256, 294, 295, 156, 504, 56/505

See application file for complete search history.

(56) References Cited

U.S. PATENT DOCUMENTS

| 4,999,984 | A  | * | 3/1991  | Pelletier | 56/249.5    |
|-----------|----|---|---------|-----------|-------------|
| 5,375,400 | A  | * | 12/1994 | Darden    | 56/17.5     |
| 5,480,351 | A  | * | 1/1996  | Coleman   | 460/72      |
| 7,155,889 | B2 | * | 1/2007  | Myers     | 56/295      |
| 7,628,346 | B1 | * | 12/2009 | Darden    | 241/101.762 |

* cited by examiner

*Primary Examiner* — Alicia M Torres
(74) *Attorney, Agent, or Firm* — Brian D. Bellamy

(57) ABSTRACT

A two piece peripheral mower blade is designed to cut and mulch grass at high volume. The blade is constructed of two pieces. The blades attach to a shaft via spaced apart hubs to which the pieces attach, and the two pieces of the blade interlock to provide a two piece peripheral mower blade.

2 Claims, 3 Drawing Sheets

TWO PIECE PERIPHERAL MOWER BLADE

PRIORITY CLAIM

The present application claims priority benefit of U.S. Provisional Patent Application No. 61/158,455 filed on Mar. 9, 2009.

BACKGROUND OF THE INVENTION

1. Field of the Invention

The present invention relates to blades for grass mowers and agricultural implements, and, particularly to the improved two piece construction of a peripheral blade.

2. Discussion of the Prior Art

U.S. Pat. No. 5,375,400 to John A. Darden teaches a peripheral mower blade that is designed to cut and mulch grass at high volume. The blade is so designed to reduce back drag and require less horsepower. Such peripheral blades offer less chance that objects will be thrown out from under the mower deck they are mounted on, nor will they come apart creating a dangerous environment for those who are around the mower. In the construction discussed by Darden in '400, the blade is one piece. At the time, Darden taught that a one piece blade made manufacture of the blade less expensive and made the blade more durable.

However, several drawbacks have been discovered with respect to the one piece peripheral mower blade. Such blades have been found time consuming and difficult to change. Since peripheral mower blades are mounted on a horizontal rotary shaft in a series containing several blades, all of the interim blades must be removed in order to replace a worn or damaged blade that is toward the center of the shaft. The one piece blades also require a series of spacers on the shaft separating the blades, and these spacers also must be dealt with when replacing or arranging the one piece peripheral blades on the shaft.

Thus, a need exists to improve peripheral mower blades to make them easier to install, especially when a blade on the center of the horizontal rotary shaft is damaged or worn. A two piece blade could be considered, but, before now, providing a two piece blade has been avoided and not seriously considered because of the belief that such blades would provide a weak structure and could break off of the shaft and present a danger of being slung outward from a mower.

DETAILED DESCRIPTION

Figure 2:
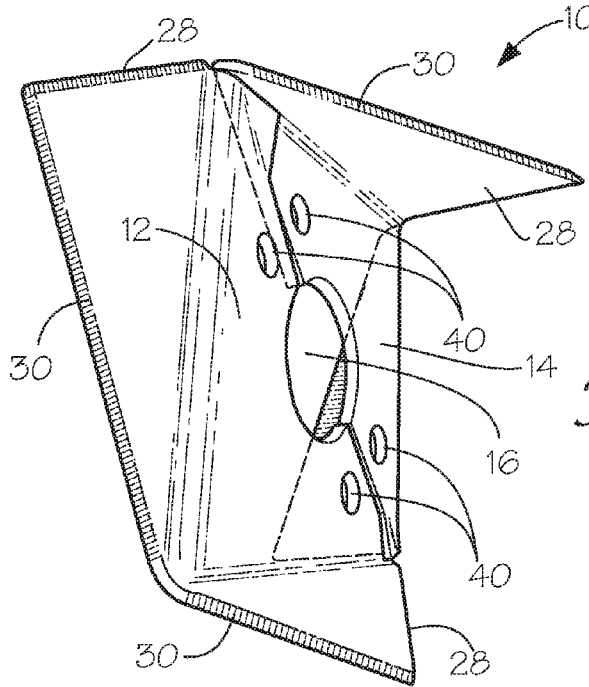
FIG. 2 is a perspective view of the two piece peripheral cutting and mulching blade.
Figure 3:
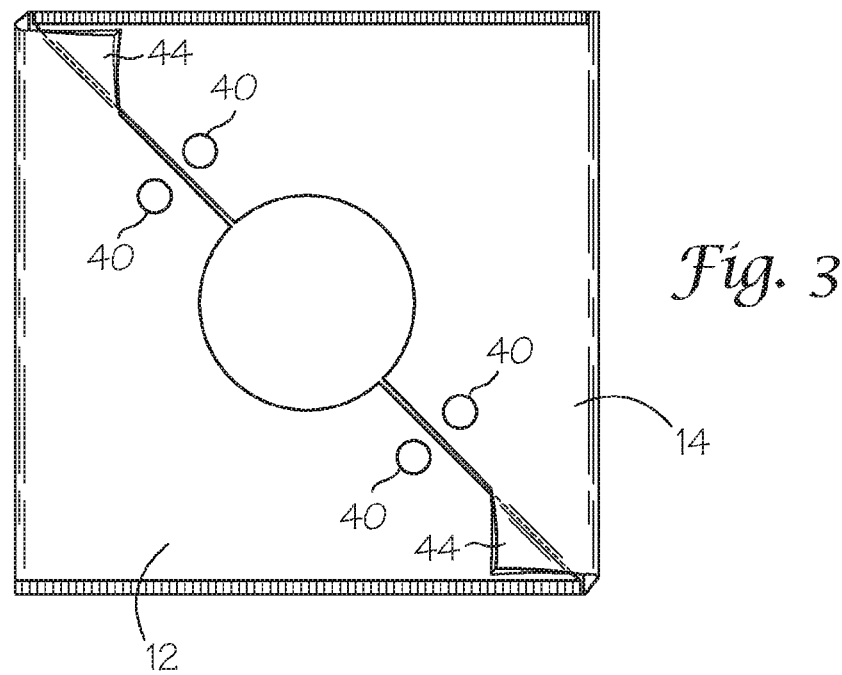
FIG. 3 is a side view of the blade of FIG. 2.

The peripheral blade 10 of FIG. 2 described is a two piece blade having two substantially triangular mounting sections 12, 14 comprising each piece. The main intent of this blade is the same as for one-piece peripheral blades: safety, less horsepower requirement, and lower maintenance cost. However, in this improved blade, the blade 10 is of a two piece construction, which makes installing and changing the blade much easier. Previously, it was considered that a two piece blade would lend itself to an increased chance of the blade flying apart, which would be hazardous to bystanders. The improvements to the peripheral blade 10 made and discussed herein provide a two piece peripheral blade that is safe to use.

When combined, the two pieces of the blade 10 with mounting sections 12, 14 provide an aperture 16 there though which a horizontal rotary shaft 18 can pass for mounting several of the two piece peripheral blades 10. Each triangular mounting surface 12, 14 has two extended sides 20, 22 and 24, 26, respectively, bent 90 degrees to the triangular mounting surface. One extended side is bent to the left and one to the right to form the blade section for cutting action. The bent extended sides 20, 22 and 24, 26 are parallel to the shaft 18 that will pass though the mounting aperture 16. The combination of the two mounting sections 12, 14 provides a square with the mounting aperture 16 in the center. The square is measured diagonally to determine the blade's size, which is selected depending on the function and size of the peripheral blade 10 that is desired. The cutting edges 28 are along the front edge of the extended sides 20, 22 and 24, 26. The length of the cutting edges 28 also depends on the desired size of the peripheral blade 10. The trailing edge 30 of the cutting blade section is angled back to the mounting section 12 or 14 of the blade 10 for strength; the cutting edge 28 is not necessarily sharpened, but is hardened for wear. Each cutting blade section formed by the extended sides 20, 22 and 24, 26 has the general shape of a right triangle with each cutting edge of each surface being oriented perpendicular to the mounting surfaces, wherein said cutting blade sections each include a diagonal surface. The blade size may vary according to the use of the blade. For instance, a smaller blade is used for carpet grasses, and a larger blade is used for heavier grasses or agricultural implementations such as cutting cotton stalks. The blade thickness can vary in accordance to blade size and use.

Figure 1A:
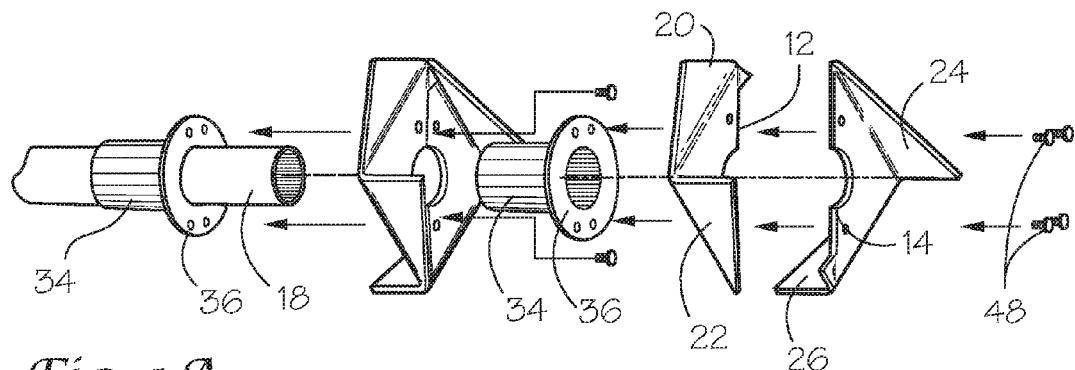
FIG. 1A is a perspective assembly view of the two piece peripheral cutting and mulching blade and horizontal rotary shaft of the present invention.
Figure 1B:
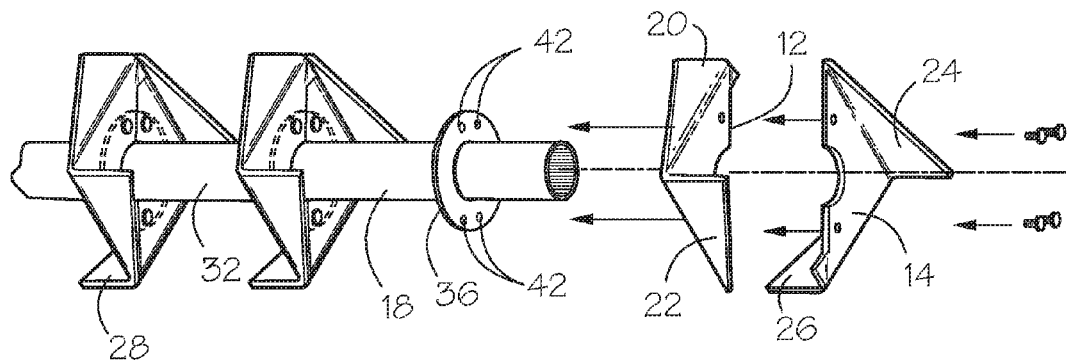
FIG. 1B is a perspective assembly view of an alternative embodiment of the two piece blade and shaft of the invention.

The two-piece peripheral blade 10 is to be mounted on a horizontal rotary shaft 18 with a number of like two-part peripheral blades of the same size spatially mounted in series on the shaft. Thus, several sets of two triangular mounting sections 12, 14 form pairs that are provided to form each complete blade 10 needed. As shown in FIGS. 1A and 1B, each blade 10 is separated on the shaft 18 by a space 32 that allows only about ½ inch of blade overlap. The space 32 between the blades may be provided by a spacer bushing 34 as shown in FIG. 1A. An advantage of the two piece blade 10 of the present invention is the possible elimination of the spacer bushing 34 as shown in FIG. 1B. As shown, two or more collars 36 for mounting the blades 10 are fixed, such as by welding, to the horizontal rotary shaft 18 in spaced relation to each other. The mounting sections 12, 14 of the blades 10 are attached to the side of each collar 36. The process of mounting the blades 10 is repeated to attach additional pairs of mounting sections 12, 14 to each of the two or more collars 36 provided on the horizontal rotary shaft 18 until each collar has a blade attached thereto. The shaft 18 is to be rotated at high speed. The blades 10 rotate and cut toward the direction of travel.

The peripheral cutting and mulching blade 10 itself includes two pieces, in particular a pair of substantially triangular mounting sections 12, 14. Each mounting section 12, 14 has an upper surface and lower surface, and each mounting section includes a first edge having a semi-circular cut-out 38 about a mid-point of the first edge. A second edge of each mounting section has a cutting blade edge 28 projecting perpendicular to the mounting section 12 or 14, and a third edge having a cutting blade edge 28 projecting perpendicular to the mounting section 12 or 14. The cutting blade edges 28 extend from the opposing surfaces of each mounting section 12 or 14, whereby one of the cutting edges extends from the upper surface and one of them extends from the lower surface. The other mounting section 12 or 14 is identical to the first and includes identical extended cutting edges 28 that extend from the opposing surfaces. When the combination of both pieces of the two piece peripheral blade 10 are mounted on the horizontal rotary shaft 18, a plurality of extended cutting edges 28 project perpendicular to the mounting sections 12 or 14, thereby forming the peripheral blade 10 as a whole. Said peripheral blades 10 include cutting edges 28 and include two of which that extend from the upper surface on the mounting sections 12 or 14 of opposing peripheral blades and two cutting edges that extend from the lower surface on the mounting sections of opposing peripheral blades.

Figure 4:
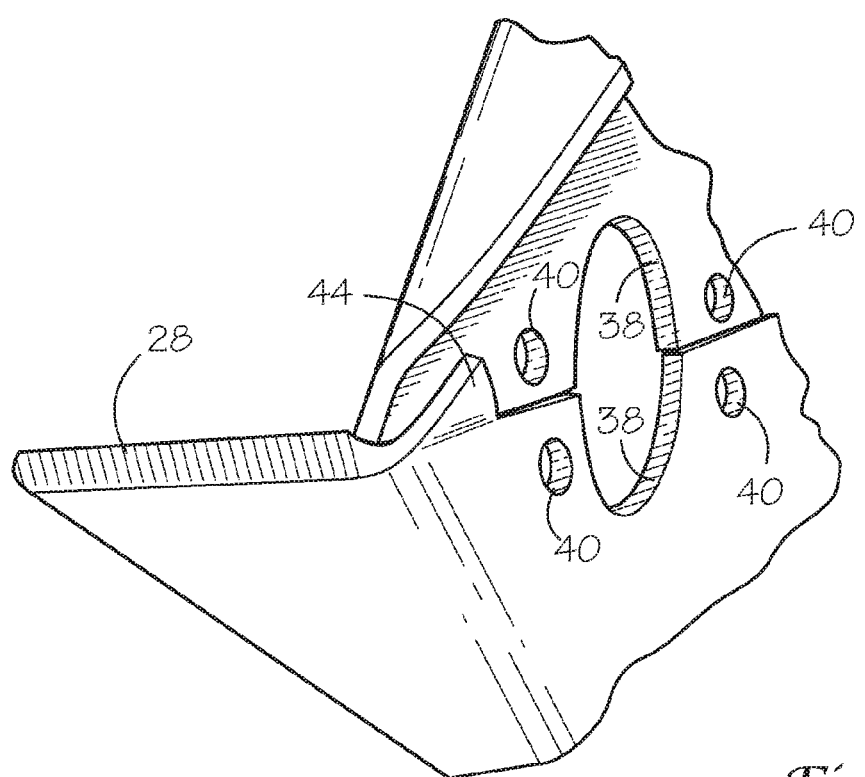
FIG. 4 is an enlarged perspective partial view of the blade of FIG. 2.
Figure 5:
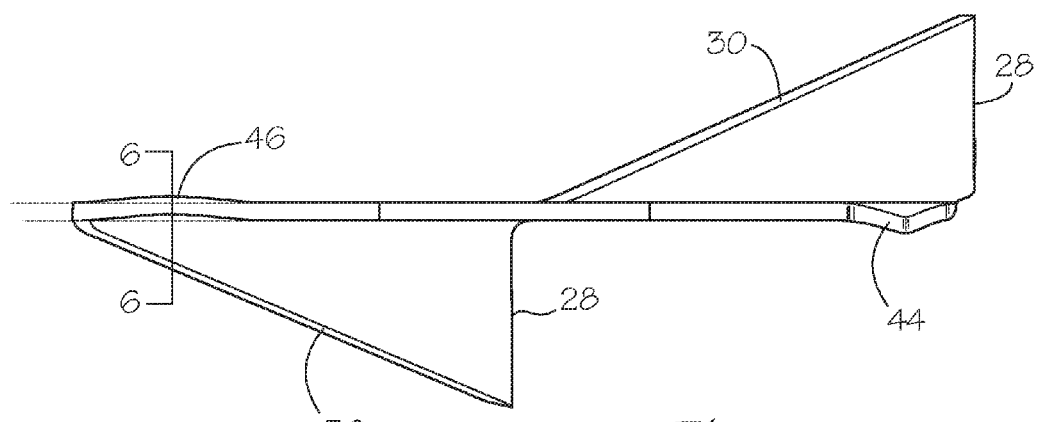
FIG. 5 is a side edge view of a mounting section of the blade of FIG. 2 in accordance with the invention.
Figure 6:
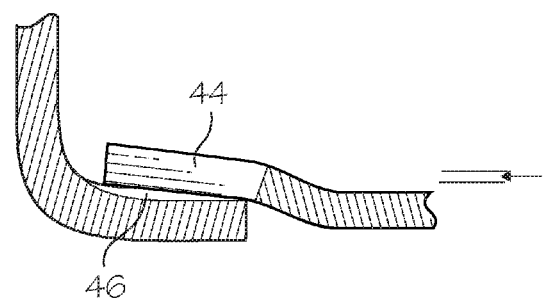
FIG. 6 is an enlarged section view of the blade at the location of line 6-6 of FIG. 5 illustrating an aspect of an embodiment of the invention.

When triangular mounting sections 12, 14 are combined for placement on the shaft 18 via the circular collar 36, the first edge of each mounting section abuts the other to form a central mounting aperture 16 from said semi-circular cut-outs. The mounting sections 12, 14 each include holes 40 for mounting the sections to the collar 36 to form the complete peripheral blade 10 on the shaft. The mounting sections 12, 14 are abutting as a pair against the collar, and the collars each include holes 42 for attachment of the mounting sections in which the holes align with those of the mounting sections. The first edge of the mounting sections 12, 14 includes a tabbed end 44 and a shallow deformed end 46. When the sections 12, 14 are mounted on the collar 36, the tabbed end 44 of each section overlaps the shallow deformed end 46 of each section of the abutting first edge of the other section as shown in FIG. 4 and FIG. 6. Bolts 48 are inserted through the aligned holes 40 and 42 of the mounting sections and the collars to attach each pair of mounting sections 12, 14 to its respective collar 36. When the abutting mounting sections 12, 14 are mounted on the collar 36, the mounting sections interlock via the tabbed ends 44 overlapping the shallow deformations of the shallow deformed ends 46. The interlocking of the mounting sections 12, 14 creates a complete two piece peripheral blade 10 in which the two parts do not slip and are not a hazard to separate or break apart. Through testing, the core mounting surfaces are found to be as secure as a one piece peripheral blade by the construction taught in the embodiments of the invention.

I claim:

1. A peripheral cutting and mulching blade comprising:
    a pair of substantially triangular mounting sections, each having an upper and lower surface, each said mounting section including a first edge having a semi-circular cut-out about a mid-point of the first edge, a second edge having a cutting blade projecting perpendicular to the mounting section, and a third edge having a cutting blade projecting perpendicular to the mounting section;
    said cutting blades including one of which extends from the upper surface and one of which extends from the lower surface;
    said first edge of each mounting section abutting the other to form a central aperture from said semi-circular cut-outs, and said mounting sections including holes for mounting said blade to a collar on a horizontal rotary shaft;
    said cutting blades including two of which extend from the upper surface on opposing blades of said mounting sections when mounted on the collar and two of which extend from the lower surface on opposing blades of said mounting sections when mounted on the collar;
    each cutting blade having the general shape of a right triangle with each cutting blade of each surface being oppositely oriented, wherein said cutting blades each include a diagonal surface; and
    said first edge of the mounting sections includes a tabbed end and a shallow deformed end and when mounted on the collar the tabbed end of one mounting section overlaps the shallow deformed end of the abutting first edge of the other mounting section, whereby when mounted on the collar the mounting sections interlock.

2. A method for mounting a peripheral cutting and mulching blade to a horizontal rotary shaft including:
    providing substantially triangular mounting sections in sets of two forming at least one pair in which the mounting sections each include a first edge having a tab on one end and semi-circular cut-out about a mid-point of the first edge, a second edge having a cutting blade projecting perpendicular to the mounting section, a third edge having a cutting blade projecting perpendicular to the mounting section, and holes for mounting the mounting sections to a collar;
    providing a rotary horizontal shaft having two or more collars having holes in each said collar for attachment of the pair of said mounting sections;
    placing said pair of the mounting sections on the horizontal rotary shaft with the first edge of each mounting section abutting the other and the tab of each overlapping the first edge of the other, and the pair of the mounting sections forming a circular aperture about the horizontal rotary shaft;
    abutting the pair of the mounting sections against a collar on the horizontal rotary shaft;
    aligning the holes of each said mounting section with the holes of the collar for attachment;
    inserting bolts through the aligned holes of the mounting sections and the holes of the collar and attaching the pair of the mounting sections to the collar on the horizontal rotary shaft by the bolts; and,
    repeating these steps to attach additional of said pair of mounting sections to each of the two or more collars provided on the horizontal rotary shaft until each collar has the blade attached thereto.

* * * * *